(12) United States Patent
Imthurn et al.

(10) Patent No.: US 8,421,655 B2
(45) Date of Patent: Apr. 16, 2013

(54) APPARATUS FOR PARALLEL ENTROPY ENCODING AND DECODING

(75) Inventors: Paul Daniel Imthurn, Santa Cruz, CA (US); Wei Cheng Joseph Ku, San Jose, CA (US); Mark Michael, Kitchener (CA)

(73) Assignees: Certicom Corp., Mississauga (CA); Research In Motion Limited, Waterloo (CA)

( * ) Notice: Subject to any disclaimer, the term of this patent is extended or adjusted under 35 U.S.C. 154(b) by 192 days.

(21) Appl. No.: 13/092,735

(22) Filed: Apr. 22, 2011

(65) Prior Publication Data
US 2011/0260896 A1    Oct. 27, 2011

Related U.S. Application Data

(60) Provisional application No. 61/343,116, filed on Apr. 23, 2010.

(51) Int. Cl.
*H03M 7/00* (2006.01)

(52) U.S. Cl.
USPC ............................... 341/107; 341/65; 341/67

(58) Field of Classification Search .................... 341/65, 341/67, 107
See application file for complete search history.

(56) References Cited

U.S. PATENT DOCUMENTS

| | | | |
|---|---|---|---|
| 6,094,151 A | 7/2000 | Schwartz | |
| 6,105,132 A | 8/2000 | Fritch | |
| 6,647,388 B2 | 11/2003 | Numao | |
| 6,677,868 B2 * | 1/2004 | Kerofsky et al. | 341/107 |
| 7,928,868 B1 * | 4/2011 | Huang et al. | 341/107 |
| 8,243,816 B2 * | 8/2012 | Tung et al. | 375/240.23 |
| 2006/0070114 A1 | 3/2006 | Wood | |
| 2007/0073694 A1 | 3/2007 | Picault | |
| 2008/0240233 A1 * | 10/2008 | Au et al. | 375/240.02 |
| 2009/0003447 A1 | 1/2009 | Christoffersen | |
| 2009/0168868 A1 | 7/2009 | Jahanghir | |
| 2009/0196355 A1 | 8/2009 | Kao | |

FOREIGN PATENT DOCUMENTS

WO    2008121663 A2    10/2008

OTHER PUBLICATIONS

Extended European Search Report mailed Aug. 1, 2011. In corresponding application No. 11163747.6.

Pastuszak G. A High-Performance Architecture of the Double-Mode Binary Coder for H264.AVC, IEEE Transaction on Circuits and Systems for Video Technology, IEEE Service Center, Piscataway, NJ, US, vol. 18, No. 7, Jul. 1, 2008, pp. 949-960, XP011225651, ISSN:1051-8215, DOI:DOI:10.1109/TCSVT.2008.920743 p. 950, col. 1, paragraph II—p. 951, col. 1, paragraph III; ; figures 2-4 p. 952, paragraph IIIB—p. 953, paragraph IIID; p. 953, paragraph IV—p. 956, paragraph IVD; figures 8,9,11,12.

Extended European Search Report dated Jul. 20, 2011. In corresponding application No. 11160321.3.

* cited by examiner

*Primary Examiner* — Khai M Nguyen
(74) *Attorney, Agent, or Firm* — Novak Druce Connolly Bove + Quigg LLP

(57) ABSTRACT

An entropy encoder block for use in a context adaptive encoder and an entropy decoder block for use in a context adaptive decoder are provided.

21 Claims, 15 Drawing Sheets

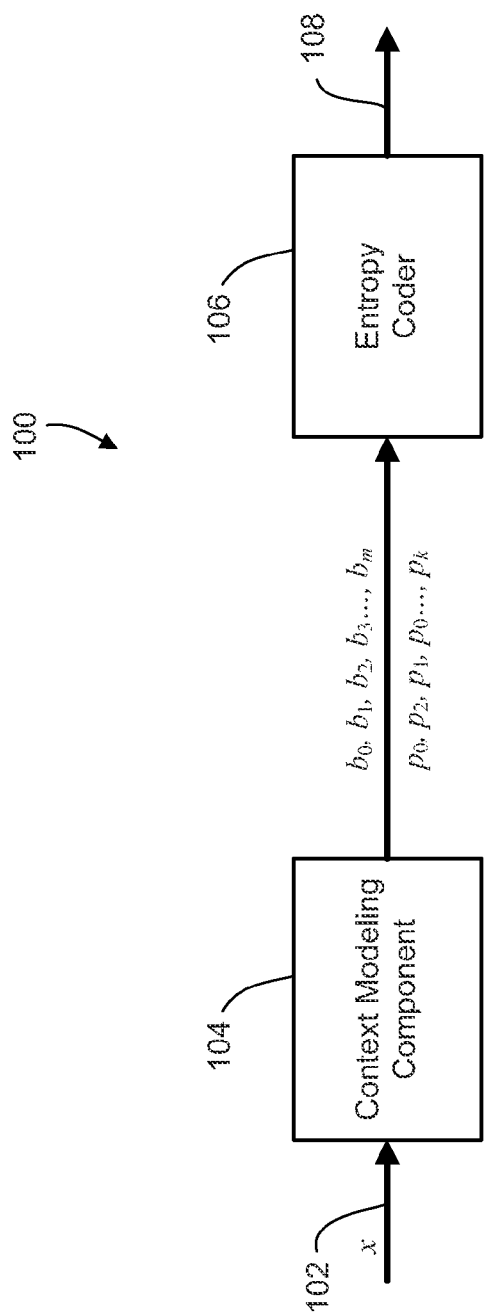

APPARATUS FOR PARALLEL ENTROPY ENCODING AND DECODING

REFERENCE TO PRIOR APPLICATIONS

The present application claims priority from U.S. Provisional Patent Application No. 61/343,116 filed Apr. 23, 2010, which is incorporated herein by reference.

FIELD

The present application generally relates to data compression and, in particular, to a parallel implementation of an entropy encoder and an entropy decoder.

BACKGROUND

Data compression, whether lossy or lossless, often uses entropy coding to encode a decorrelated signal as a sequence of bits, i.e. a bitstream. Efficient data compression has a wide range of applications, such as data, image, audio, and video encoding. By way of example, ITU-T H.264/MPEG AVC is a video coding standard widely used for encoding/decoding video. It defines a number of different profiles for different applications, including the Main profile, Baseline profile and others.

There are a number of standards for encoding/decoding images and videos, including H.264, that employ lossy compression processes to produce binary data. For example, H.264 includes a prediction operation to obtain residual data, followed by a DCT transform and quantization of the DCT coefficients. The resulting data, including quantized coefficients, motion vectors, coding mode, and other related data, is then entropy coded to generate a bitstream of data for transmission or storage on a computer-readable medium.

A number of coding schemes have been developed to encode binary data. For example, JPEG images may be encoded using Huffman codes. The H.264 standard allows for two possible entropy coding processes: Context Adaptive Variable Length Coding (CAVLC) or Context Adaptive Binary Arithmetic Coding (CABAC). CABAC results in greater compression than CAVLC, but CABAC is more computationally demanding.

An entropy encoder/decoder is a component within a compression encoder/decoder. While the entropy encoder/decoder consumes only a small portion of the overall compression encoder/decoder, it can present a significant bottleneck in real-time compression because of the serial nature of its operation.

It would be advantageous to provide for an improved implementation of an entropy encoder and an entropy decoder.

BRIEF DESCRIPTION OF THE DRAWINGS

Reference will now be made, by way of example, to the accompanying drawings which show example embodiments of the present application, and in which:

FIG. 1 shows, a block diagram of an encoding process;

Similar reference numerals may have been used in different figures to denote similar components.

DESCRIPTION OF EXAMPLE EMBODIMENTS

Figure 2A:
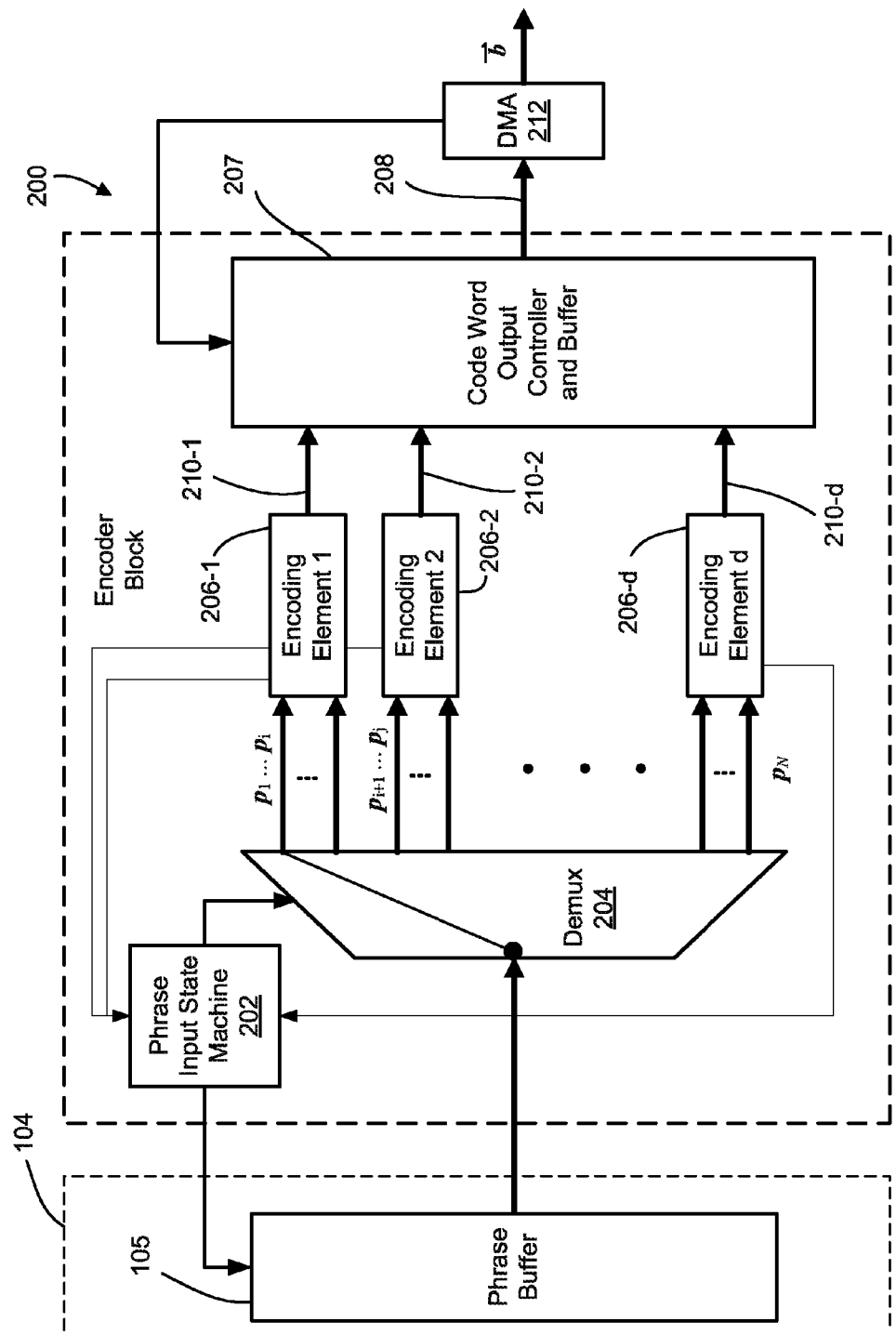
FIG. 2a shows, in block diagram form, an embodiment of an entropy encoder.

In one aspect, the present application describes a hardware implementation of a parallel entropy encoder and a parallel entropy decoder. In an embodiment, a computing device may be provided including one or both of the parallel entropy encoder and parallel entropy decoder.

In an embodiment, an entropy encoder block for use in a context adaptive encoder may be provided. The entropy encoder block for encoding phrase words into code words using N search trees, the N search trees each corresponding to a probability from a set of N probabilities used by a context modeling component of the context adaptive encoder, the context modeling component processing each phrase word to determine an associated probability corresponding to one of the N probabilities for each phrase word. The entropy encoder block may comprise a plurality of encoding elements for receiving, from the context modeling component, phrase words and an indication of the associated probability for each phrase word, each encoding element of the plurality of encoding elements including an encoder having: an encoding engine; and one or more lookup tables each containing search tree data representative of one of the N search trees such that all N search trees are represented by at least one encoding element, but not all N search trees are represented in every encoding element, the encoding engine operative to receive input phrase words and encode each input phrase word using a lookup table corresponding to the indication of the associated probability of the input phrase word.

In an aspect of the entropy encoder block each encoding element of the plurality of encoding elements may further have a state machine in communication with the encoder of that encoding element, the state machine operative to direct the encoder to select a corresponding lookup table to the indication of the associated probability of the input phrase word for use by the encoding engine when processing the input phrase word.

Each encoding element of the plurality of encoding elements may further include one or more input buffers, each input buffer assigned to one of the one or more lookup tables; and a multiplexing element in communication with the one or more input buffers and the encoder, the multiplexing element driven by the state machine, the state machine operative to direct the encoder to select the corresponding lookup table by directing the multiplexing element to select a one of the one or more input buffers to transfer the phrase word to the encoder, the one of the one or more input buffers indicating to the encoder to select the corresponding lookup table.

The entropy encoder block may further comprise a de-multiplexing element in communication with a phrase buffer serviced by the context modeling component and in communication with the one or more input buffers of all of the plurality of encoding elements, the de-multiplexing element driven by a phrase input state machine; the phrase input state machine in communication with the phrase buffer and in communication with the one or more input buffers of all of the plurality of encoding elements, such that the phrase input state machine directs the phrase buffer to transfer a phrase word to the de-multiplexing element and directs the de-multiplexing element to transfer the phrase word to a one of the one or more input buffers of all of the plurality of encoding elements that corresponds to the indication of the associated probability for that phrase word when the one of the one or more input buffers of all of the plurality of encoding elements is available.

In an aspect, the entropy encoder block may further comprise a code word output controller and buffer in communication with the output buffers from each of the encoding elements, and in communication with a downstream component for receiving completed code words; the code word output controller and buffer operative to receive the code word and the associated probability from the encoding elements and direct each code word to a corresponding one of N code word buffers based on the associated probability; wherein the code words are collected in the N code word buffers to complete the code words for each associated probability.

In an aspect, each encoding element may include an equal number of search tree lookup tables from the N search trees.

In an aspect, the N search trees may be distributed across the encoding elements based on an estimated frequency of occurrence of each associated probability, such that encoding elements with comparatively fewer input buffers are servicing phrase words with the associated probability having a higher estimated frequency of occurrence and encoding elements with comparatively more input buffers are servicing phrase words with the associated probability having a lower estimated frequency of occurrence, whereby estimated workloads of encoding elements are substantially balanced.

In an aspect at least two of the encoding elements each include a copy of a same encoding lookup table.

In an embodiment, a computing device may be provided comprising a processor, memory and an entropy encoder including the entropy encoder block described above.

In an embodiment, an entropy decoder block for use in a context adaptive encoder may be provided. The entropy decoder block for decoding code words into phrase words using N search trees, each search trees each corresponding to a probability from a set of N probabilities used by a context modeling component, the context modeling component processing each code word to determine an associated probability corresponding to one of the N probabilities for each code word. The entropy decoder block may comprise a plurality of decoding elements for receiving, from the context modeling component, code words and an indication of the associated probability for each code word, each decoding element comprising: a decoding engine; and one or more lookup tables each containing search tree data representative of one of the N search trees such that all N search trees are represented by at least one decoding element, but not all N search trees are represented in every decoding element, the decoding engine operative to receive input code words and decode each input code word using a lookup table corresponding to the indication of the associated probability of the input code word.

In an aspect, of the entropy decoder block each decoding element of the plurality of encoding elements may further have a state machine in communication with the decoder of that decoding element, the state machine operative to direct the decoder to select a corresponding lookup table to the indication of the associated probability of the input code word for use by the decoding engine when processing the input code word.

Each decoding element of the plurality of decoding elements may further include one or more output buffers, each output buffer assigned to one of the one or more lookup tables; and a de-multiplexing element in communication with the one or more output buffers and the decoder, the de-multiplexing element driven by the state machine, the state machine operative to direct the decoder to select the corresponding lookup table based upon the indication of the associated probability and to direct the de-multiplexing element to select a one of the one or more output buffers assigned to the associated probability and to transfer the leaf node content to the selected one of the one or more output buffers.

The entropy decoder block may further comprise a de-multiplexing element in communication with a code buffer serviced by the context modeling component and in communication with the decoding elements, the de-multiplexing element driven by a code input state machine; the code input state machine, in communication with the code buffer and the decoding elements, operative to direct the code huller to transfer a code word to the de-multiplexing element and direct the de-multiplexing element to transfer the code word to a one of the decoding elements available to process the code word with the indication of the associated probability for that code word.

Each state machine of the decoding elements may be operative to direct the decoder for that decoding element to operate when all of the one or more output buffers are available.

In an aspect, each decoding element may include an equal number of lookup tables from the N search trees.

In an aspect of the entropy decoder block the lookup tables may be distributed across the decoding elements based on an estimated frequency of occurrence of each associated probability, such that decoding elements with comparatively fewer lookup tables are servicing code words with the associated probability having higher estimated frequency of occurrence and decoding elements with comparatively more lookup tables are servicing code words with the associated probability having a lower estimated frequency of occurrence, whereby estimated workloads of decoding elements are substantially balanced.

In an aspect, each decoding element may further comprise an input buffer for each of the one or more lookup tables, the indication of the associated probability comprises a selection of the input buffer.

In an aspect, at least two of the decoding elements each include a copy of a same lookup table.

In an embodiment, a computing device may be provided. The computing device may comprise a processor, memory and an entropy decoder including an entropy decoder block described above.

The parallel entropy encoder and decoder described within is in ended for use within a data compression and decompression scheme that employs a context based variable length coding scheme such as the Context Adaptive Variable Length Coding (CAVLC) process described in the H.264 standard, or other similar coding processes. For instance, the parallel entropy encoder and decoder could be used with the PARALLEL ENTROPY CODING AND DECODING METHODS AND DEVICES described in U.S. patent application Ser. No. 12/707,797 (incorporated herein by reference), and may be conveniently referred to as a Context-Based Adaptive Variable-length to Variable-length code (CAV2V) algorithm.

While examples are provided in this description with reference to the above CAVLC and CAV2V algorithms, it will be understood by the person of skill in the art that this is only an embodiment, and the entropy encoder and entropy decoder described herein may be more generally applied.

One of the techniques used in some entropy coding schemes, such as CAVLC and CABAC, both of which are used in H.264/AVC, is context modeling. With context modeling, each bit of the input sequence has a probability within a context, where the probability and the context is given by the bits that preceded it. In a first-order context model, the context may depend entirely upon the previous bit (symbol). In many cases, the context models may be adaptive, such that the probabilities associated with symbols for a given context may change as further bits of the sequence are processed.

Reference is made to FIG. 1, which shows a block diagram of an encoding process 100. The encoding process 100 includes a context modeling component 104 and an entropy encoder 106. The context modeling component 104 receives the input sequence x 102, which in this example is a bit sequence ($b_0, b_1, \ldots, b_n$). The context modeling component 104 determines a context for each bit b based on one or more previous bits in the sequence, and determines, based on the adaptive context model, a probability p associated with that bit b, where the probability is the probability that the bit will be the Least Probable Symbol (LPS). The LPS may be "0" or "1" in a binary embodiment, depending on the convention or application. The context modeling component outputs the input sequence, i.e. the bits ($b_0, b_1, \ldots, b_n$) along with their respective probabilities ($p_0, p_1, \ldots, p_n$). The probabilities are an estimated probability determined by the context model. This data is ten input to the entropy encoder 106, which codes the input sequence using the probability information. For example, the entropy encoder 106 may be a binary arithmetic encoder. The entropy encoder 106 outputs a bitstream 108 of encoded data.

It will be appreciated that each bit of the input sequence is processed serially to update the context model, and the serial bits and probability information are supplied to the entropy encoder 106, which then entropy encodes the bits to create the processed bitstream 108.

In some embodiments a decoder may generate intermediate phrase words comprised of phrase word bits and packed phrase word bits that require additional processing to yield the phrase word. In general, such packed phrase word bits are a more efficient representation of the bits to reduce storage requirements. For instance, along string of 1's followed by a '1' or a long string of '1's followed by a '0' may be replaced with a value indicating the number of 1's in the string. The numerical value having been extracted from the entropy encoded code word.

Control logic to convert the numeric value to a string of 1's or 0's may reside either in the decoder, or may reside in a downstream processing block with larger memory buffers to accommodate the expanded string. In the embodiment below it is assumed that said control logic is contained in a downstream processing block, but both embodiments are contemplated.

In some embodiments, explicit probability information may not be passed from the context modeling component 104 to the entropy decoder; rather, in some instances, for each bit the context modeling component 104 may send the entropy decoder, for instance through the entropy encoder 106, an indication of the associated probability such as an index value, flag, control signal or other indicator that reflects the probability estimation made by the context modeling component 104 based on the context model and the current context of the input sequence 102. The indication of the associated probability is indicative of the probability estimate associated with its corresponding bit.

In some embodiments, a probability for each bit will not be communicated, but instead bits of the same probability will be grouped together and the number of bits (or bytes or code words) and the probability of the group will be communicated, for instance as a header for the group.

In some embodiments, the probability information may be communicated as side band information, for instance by transferring a bit to an input buffer assigned to the same associated probability as the bit. In such an embodiment the indication of the associated probability comprises transferring a bit to an input buffer assigned to the associated probability.

In accordance with one aspect, the present application proposes a hardware architecture for an entropy encoder and a hardware architecture for an entropy decoder. Both hardware architectures having a parallel processing architecture for entropy encoding or decoding.

Referring to FIG. 2a which shows in block diagram form, an embodiment of an entropy encoder block 200. The entropy encoder block 200 is downstream from a context modeling component 104 which, for each bit of the input sequence, determines an estimated probability based on the context model. The context modeling component assigns each bit to one of N probabilities from the context model, each probability having a search tree associated with it. The context modeler 104 makes the bit and an indication of the associated probability available to the entropy encoder block 200. In the context of the embodiment of FIG. 2a, the context modeling component 104 is illustrated as presenting a phrase buffer 105 in communication with the entropy encoder block 200.

In the embodiment of FIG. 2a, the entropy encoder block 200 includes a phrase input state machine 202 that is in operative communication with the phrase buffer 105 and a de-multiplexing element 204. The phrase input state machine 202 is also in operative communication with a plurality of encoding elements 206-1 . . . 206-d. The phrase input state machine 202 is operative to receive a state of an input buffer in each encoding element 206-1 . . . 206-d and to send an indication of a probability associated with each phrase word being input into each encoding element 206-1 . . . 206-d. In this embodiment, the phrase input state machine 202 may direct the phrase word and associated indication of probability to one of the encoding elements 206-1 . . . 206-d as specified by the probability information sent with the phrase word and the associated indication of probability from the phrase buffer 105.

In an alternate embodiment, the phrase buffer 105 may communicate directly with the plurality of encoding elements 206-1 . . . 206-d. The phrase buffer 105 may include an alternate indication of the associated probability, for instance by including a flag or control signal corresponding to each phrase word. The embodiment of FIG. 2a provides an embodiment for an indication of the associated probability by directing the input phrase words to an input buffer (not shown in FIG. 2a) assigned to a specific lookup table that corresponds to the associated probability. Both embodiments are contemplated.

The phrase input state machine 202 is further operative to receive probability and buffer information from the phrase buffer 105 and to direct the phrase buffer 105 to transfer an indicated phrase word to the de-multiplexing element 204.

The de-multiplexing element 204 is in communication with the phrase buffer 105 to receive phrase words as directed by the phrase input state machine 202. The phrase input state machine 202 is further operative to direct the de-multiplexing element 204 to direct the received phrase word to one of a plurality of input buffers (not shown in this figure) distributed across the plurality of encoding elements 206-1 . . . 206-*d* when an input buffer is detected as available. Each of the plurality of input buffers is associated with one of the N probabilities from the context model. In the embodiment of FIG. 2*a* there are N input buffers, each buffer associated with one of the N probabilities.

Each encoding element 206-1 . . . 206-*d* is operative to encode bits associated with a subset of the N probabilities. In order to encode the phrase using the context model, it is necessary that each of the N probabilities are represented by at least one encoding element 206-1 . . . 206-*d*.

While the embodiment of FIG. 2*a* illustrates the use of N input buffers across d encoding elements, alternative embodiments may employ more than N input butlers to allow multiple encoding elements 206-1 . . . 206-*d* to encode phrase words with the same probability. Criteria for determining the distribution of input buffers across the encoding elements 206-1 . . . 206-*d* will be discussed in further detail below.

Having a greater than N input buffers allows for multiple encoding elements to process the phrase words having the same associated probability. This processing may occur at the same time, or may occur while the other encoding elements are processing phrase words having a different associated probability. This is useful, for instance, where some probabilities have a higher workload than others, such that it would be advantageous to have multiple encoding elements available to process phrase words associated with those probabilities so that phrase words continue to be processed in parallel, rather than waiting for one encoding element to process a string of phrase words having the same associated probability.

Figure 4A:
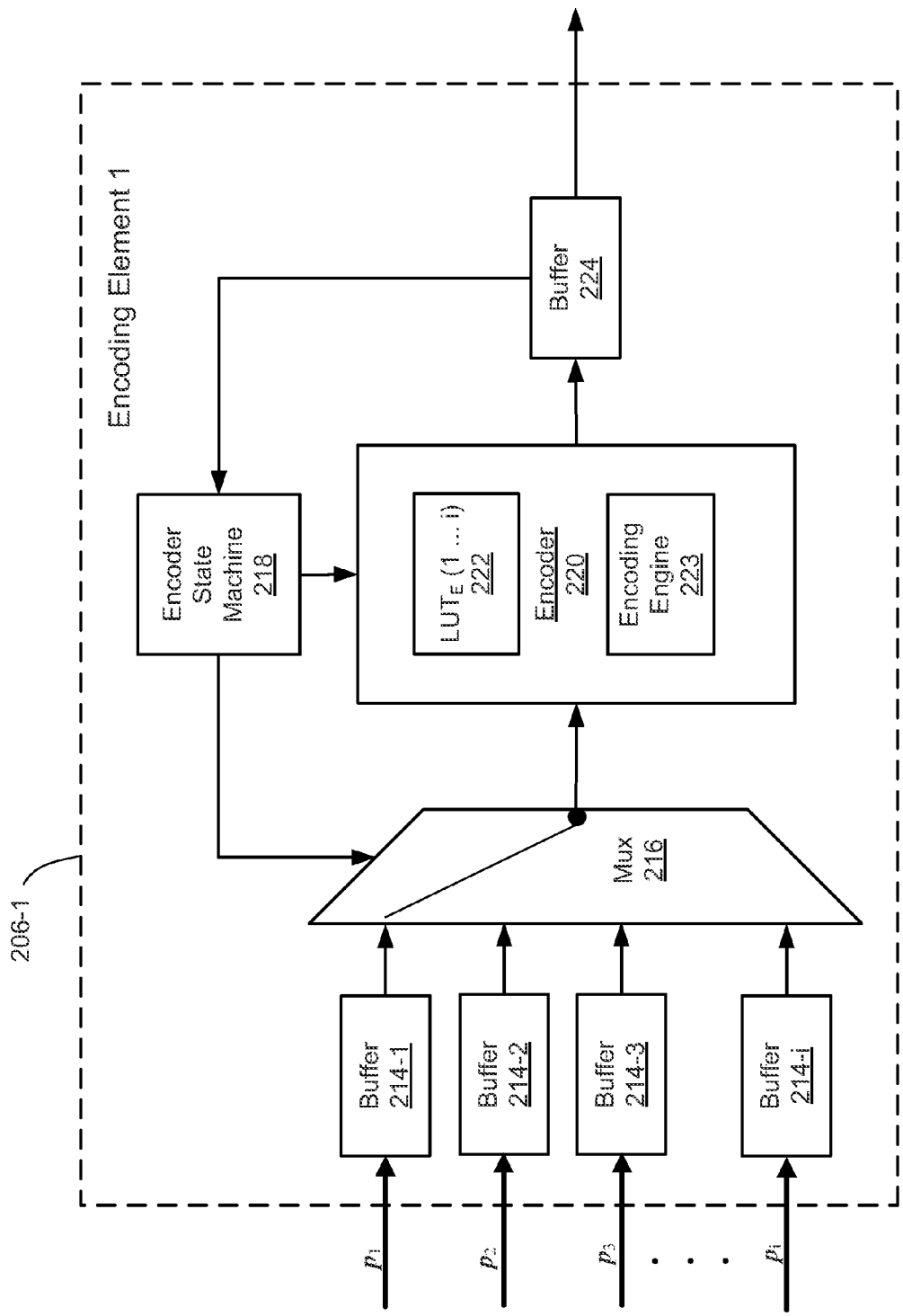
FIG. 4a shows, in block diagram form, an embodiment of an entropy encoder element.
Figure 10A:
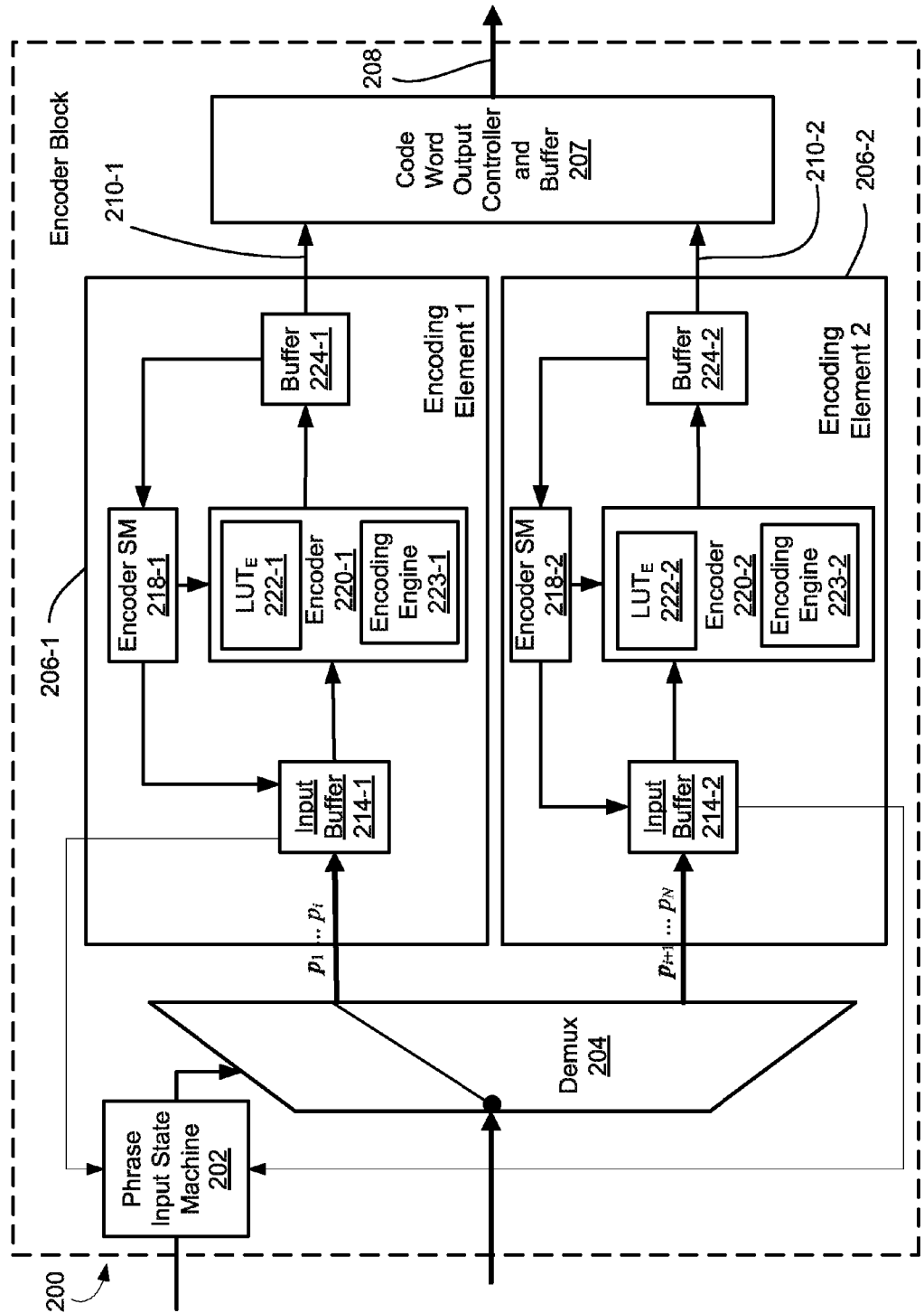
FIG. 10a shows, in block diagram form, an embodiment of an entropy encoder.

In the embodiment of FIG. 4*a*, for instance, the subset of probabilities serviced by the encoding element 206-1 corresponds to encoding element input buffers 214-1 . . . 214-*i* of the encoding element 206-1. In an alternate embodiment, d input buffers and d encoder elements are provided, each buffer associated with one of the d encoder elements. Encoder elements may process more than one probability by receiving an indication of associated probability, for instance by way of an index, flag or control signal as described above. In the embodiment of FIG. 10*a*, for instance, 2 encoder elements 206-1, 206-2 each provide a single input buffer 214-1 and 214-2 respectively.

Referring to FIG. 2*a*, the entropy encoding elements 206-1 . . . 206-*d* each communicate through a communication channel output, 210-1 . . . 210-*d* respectively, to a code word output controller and buffer 207. As will be appreciated, inclusion of an element performing the function of a code word output controller and buffer 207 is not necessarily included within the encoder block 200, provided that downstream components include the functionality to combine the outputs 210-1 . . . 210-*d*. In the embodiment of FIG. 2*a*, a downstream DMA 212 is illustrated for transferring completed code words on as a bitstream.

Figure 2B:
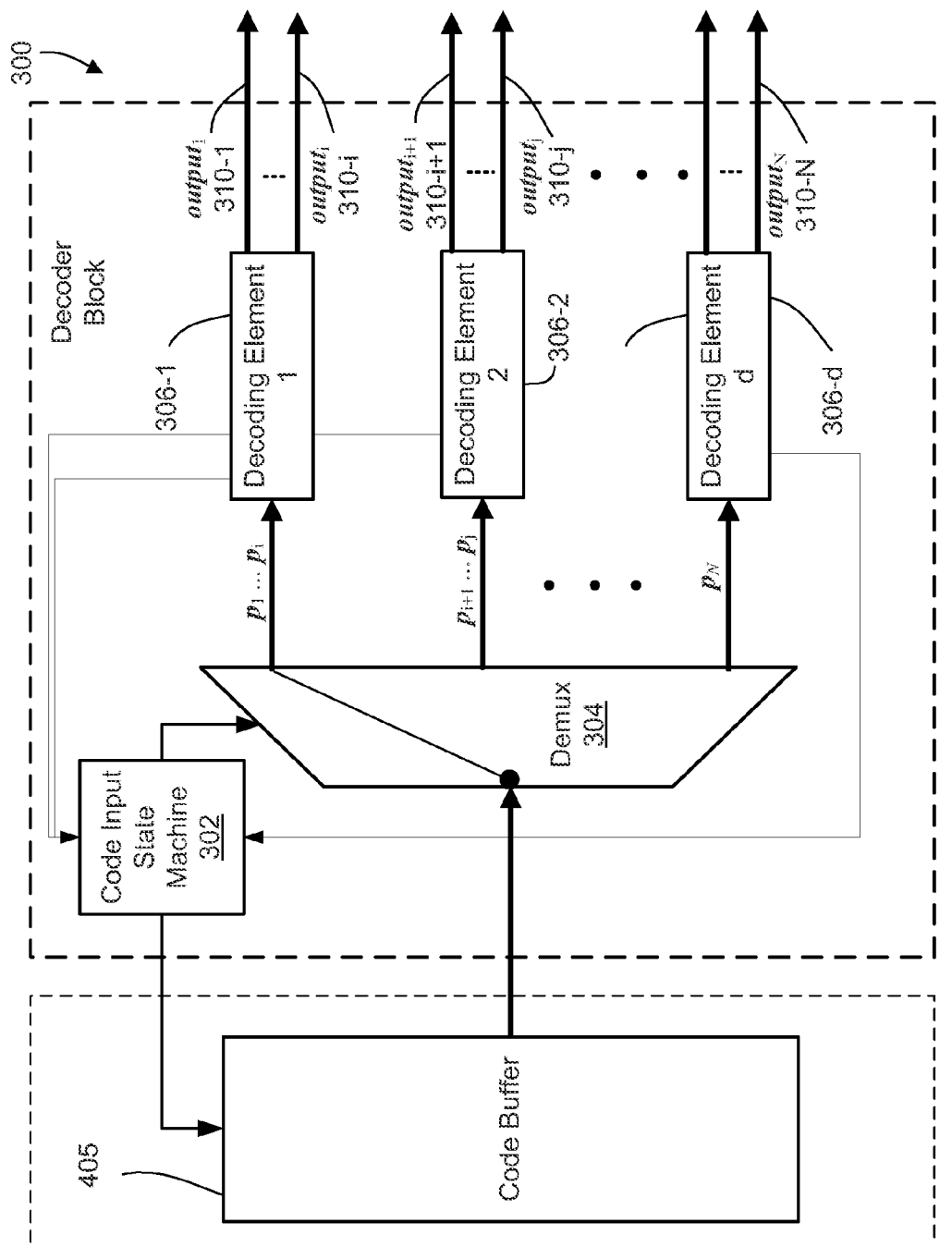
FIG. 2b shows, in block diagram form, an embodiment of an entropy decoder.

Referring to FIG. 2*b* which shows in block diagram form, an embodiment of an entropy decoder block 300. The entropy decoder block 300 is downstream from and in communication with a code buffer 405. The code buffer 405 contains the code words and probability information produced by the entropy encoder 104.

The entropy decoder block 300 includes a code input state machine 302 that is in operative communication with the code buffer 405 and a de-multiplexing element 304. The code input state machine 302 is also in operative communication with a plurality of decoding elements 306-1 . . . 306-*d*. The code input state machine 302 is operative to receive a state of an input buffer in each decoding element 306-1 . . . 306-*d* and to send an indication of a probability associated with each code word being input into each decoding element 306-1 . . . 306-*d*.

In the embodiment of FIG. 2*b*, the code input state machine 302 is further operative to receive probability and buffer information from the code buffer 405 and to direct the code buffer 405 to transfer an indicated code word to the de-multiplexing element 304.

The de-multiplexing element 304 is in communication with the code buffer 405 to receive code words as directed by the code input state machine 301. The code input state machine 302 is further operative to direct the de-multiplexing element 304 to direct the received code word to an input buffer (not shown in this figure) of one of the plurality of decoding elements 306-1 . . . 306-*d* able to service the probability associated with the code word when an input buffer is detected as being available. Each of the plurality of decoding elements 306-1 . . . 306-*d* having an associated subset of the N probabilities from the context model, such that every probability is assigned to at least one decoding element 306-1 . . . 306-*d*. In the embodiment of FIG. 2*b* each probability is assigned to only one of the decoding elements 306-1 . . . 306-*d*.

The embodiment of FIG. 2*b* is suitable, for instance, where the there is no one probability much larger than the others such that the probabilities can be evenly distributed across the decoding elements 306-1 . . . 306-*d* such that a sum of assigned probabilities for each decoding element 306-1 . . . 306-*d* is roughly equal. As explained above for the case of more encoding input buffers than N probabilities, the goal is to minimize the number of assigned probabilities while ensuring an equal distribution of probability such that all decoding elements 306-1 . . . 306-*d* are approximately equally used.

Each decoding element 306-1 . . . 306-*d* is operative to decode bits associated with a subset of associated probabilities from the N probabilities. In order to decode all possible code words, it is necessary that each of the N probabilities is represented by at least one associated decoding element 306-1 . . . 306-*d*.

While the embodiment of FIG. 2*b* illustrates the use of each probability being assigned to only one of the decoding elements 306-1 . . . 306-*d*, alternative embodiments may assign more than one decoding element 306-1 . . . 306-*d* to one or more of the probabilities. Criteria for determining the assignment of decoding elements 306-1 . . . 306-*d* to probabilities will be discussed in further detail below.

Assigning more than one decoding element 306-1 . . . 306-*d* to one or more of the probabilities allows for multiple decoding elements 306-1 . . . 306-*d* to process the code words having the same associated probability at the same time. This is useful, for instance, where some probabilities are much higher than others, such that it would be advantageous to have multiple decoding elements 306-1 . . . 306-*d* available to process code words associated with those probabilities so that code words continue to be processed in parallel, rather than waiting for one decoding element to process a string of code words having the same associated probability.

In the embodiment of FIG. 2b, the entropy decoders 306-1 . . . 306-d each communicate through a communication channel output, 310-1 . . . 310-N for output to a downstream processing component. In an embodiment where more than one decoding element 306-1 . . . 306-d is assigned to one or more of the probabilities, additional control logic will be required to combine the outputs of the same probability from different decoding elements 306-1 . . . 306-d. The additional control logic may be maintained in the downstream processing component, or the outputs may be combined within the decoder block 300 before being passed to the downstream processing component.

The code input state machine 302 sorts an input code word based upon its probability to identify a search tree decoding lookup table associated with that probability and then assigns the code word to an entropy decoder able to access the corresponding decoding lookup table to traverse the associated tree, process a specified number of bits at each branch node of the associated tree, to arrive at a leaf node that yields leaf node contents for that code word.

Figure 3A:
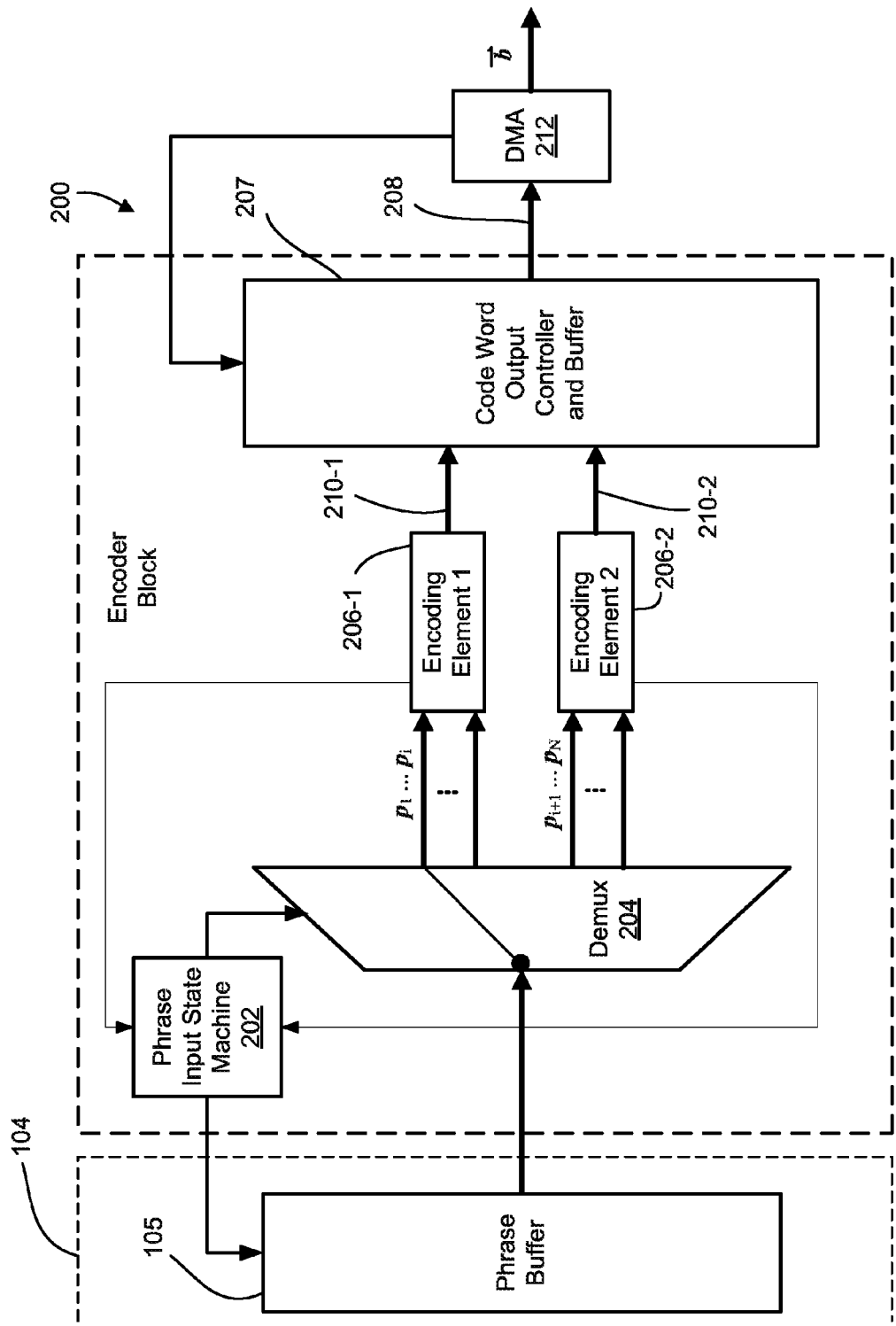
FIG. 3a shows, in block diagram form, an embodiment of an entropy encoder.

FIG. 3a illustrates an embodiment of FIG. 2a where d=2 such that there are two encoding elements 206-1 206-2. Other than the selection of an embodiment of two encoding elements 206-1 206-2, FIG. 3a is similar to FIG. 2a.

Figure 3B:
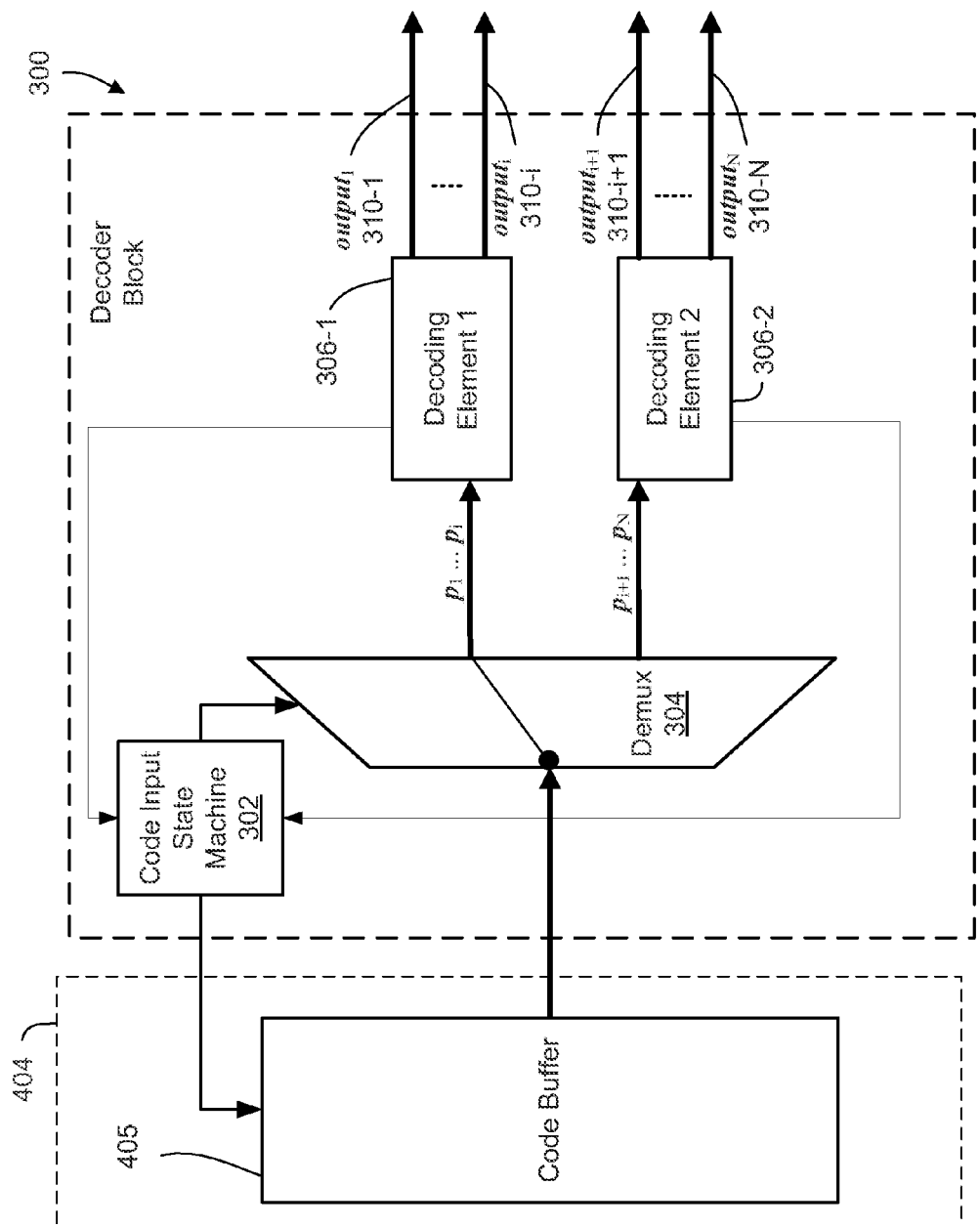
FIG. 3b shows, in block diagram form, an embodiment of an entropy decoder.

FIG. 3b illustrates an embodiment of FIG. 2b where d=2 such that there are two decoding elements 306-1 306-2. Other than the selection of an embodiment of two decoding elements 306-1 306-2, FIG. 3a is similar to FIG. 2a.

FIG. 4a is an expanded view of an embodiment of an encoding element 206-1 from FIGS. 2a and 3a. The encoding element 206-1 comprises i encoder input buffers 214-1 . . . 214-i, each encoder input buffer 214-1 . . . 214-i associated with one of the N probabilities. A multiplexing element 216, driven by an encoder state machine 218, is in communication with the encoder input buffers 214-1 . . . 214-i and an encoder 220. Entropy encoder 220 comprises an encoding engine 223 and i encoding lookup tables 222-1 . . . 222-i. Each encoding lookup table 222-1 . . . 222-i corresponding to one of the encoder input buffers 214-1 . . . 214-i and its associated probability. The encoding lookup tables 222-1 . . . 222-i each comprising an encoding search tree associated with one of the associated probabilities.

The encoder state machine 218 is operative to direct the multiplexing element 216 to transfer phrase bits from the encoder input buffers 214-1 . . . 214-i to the encoder 220 for encoding when the output buffer 224 is available. The encoder state machine 218 is further operative to direct the encoder 220 to select a lookup table from the i encoding lookup tables 222-1 . . . 222-i, the lookup table associated with the same probability as the encoder input buffer 214-1 . . . 214-i.

Encoding engine 223 operates on the phrase bits by traversing the selected lookup table to generate an output code word. Upon generating the output code word, the encoder 220 transfers the code word to a code word output buffer 224. When a downstream processing block transfers the code word from the code word output buffer 224, the encoder state machine 218 selects another encoder input buffer 214-1 . . . 214-i for encoding.

Figure 4B:
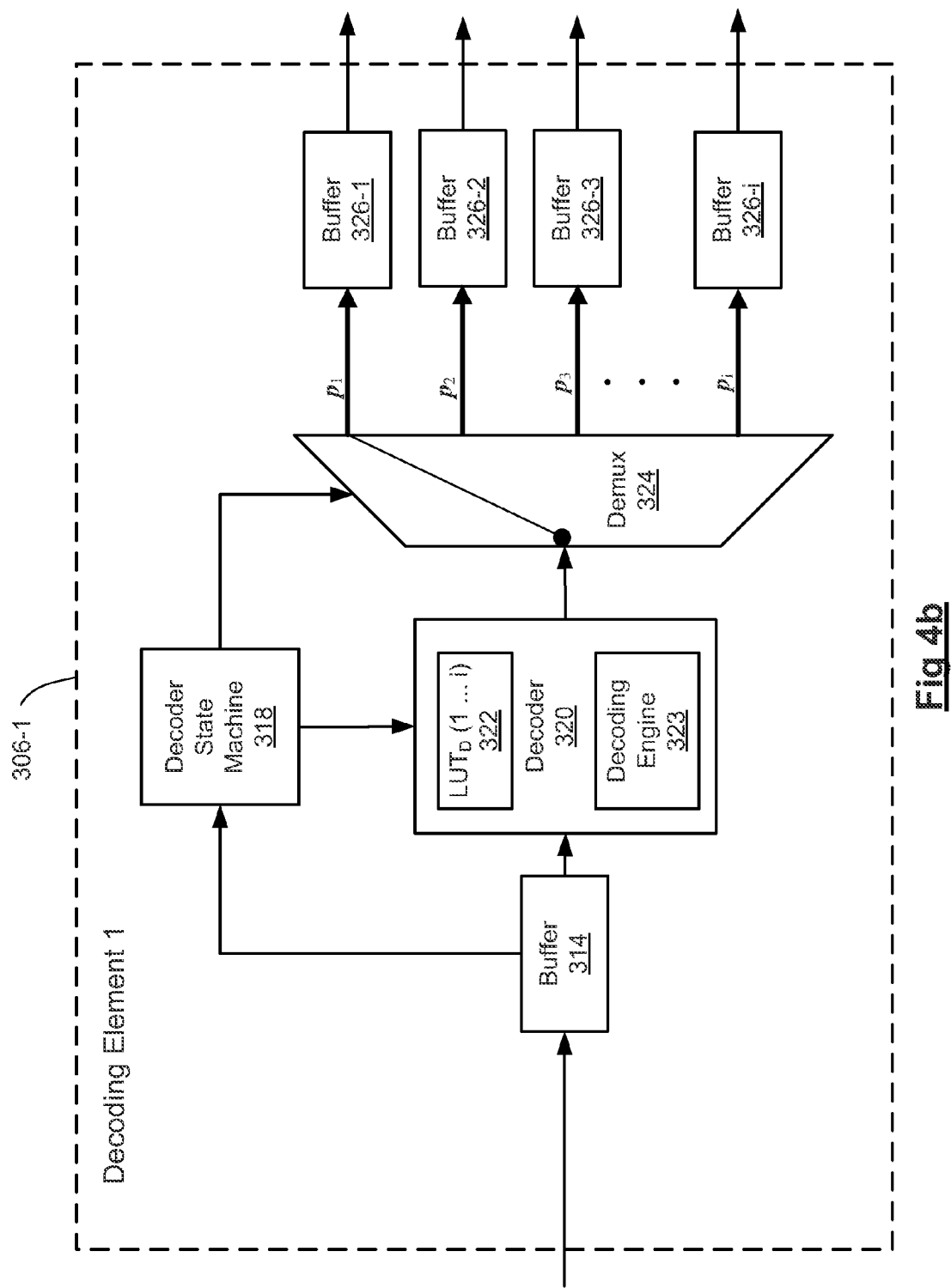
FIG. 4b shows, in block diagram form, an embodiment of an entropy decoder element.

FIG. 4b is an expanded view of an embodiment of decoding element 306-1 from FIGS. 2b and 3b. The decoding element 306-1 comprises a decoder input buffer 314 in communication with a decoder state machine 318 and an entropy decoder 320. The decoder state machine 318 in communication with the decoder input buffer 314, the decoder 320 and a de-multiplexing element 324. The decoder state machine operative to read from the decoder input buffer 314 an indication of the probability associated with the code word in the decoder input buffer 314, and operative to direct the decoder 320 to select a decoding lookup table 322-1 . . . 322-i corresponding to the probability associated with the code word.

The decoder 320 comprising an entropy decoding engine 323 and i decoding lookup tables 322-1 . . . 322-i. Each decoding lookup table 322-1 . . . 322-i corresponding to one of the associated probabilities serviced by the decoding element 306-1. The decoding lookup tables 322-1 . . . 322-i each comprising a decoding search tree associated with an associated probability.

The decoder state machine 318 further operative to direct the decoder de-multiplexing element 324 to distribute output bits from the decoder 320 to one of i decoder output buffers 326-1 . . . 326-i. Each decoder output buffer 326-1 . . . 326-i corresponding to one of the i probabilities serviced by the encoding element 306-1.

Decoding engine 323 operates on the code bits by traversing the selected decoding lookup table 322-1 . . . 322-i to locate the leaf node contents. The leaf node contents comprising a portion, or a compressed portion, of the phrase being decoded. Upon generating the leaf node contents, the decoder 320 transfers the leaf node contents to the decoder de-multiplexing element 324 for transfer to the corresponding decoder output buffer 326-1 . . . 326-i.

The leaf node contents will need to be collected, assembled and decompressed in a downstream processing component to re-create the phrase word. An embodiment of such a component, code word output controller and buffer 207 in combination with Direct Memory Access controller (DMA) 250 is shown in FIG. 6 and discussed further below.

Figure 5A:
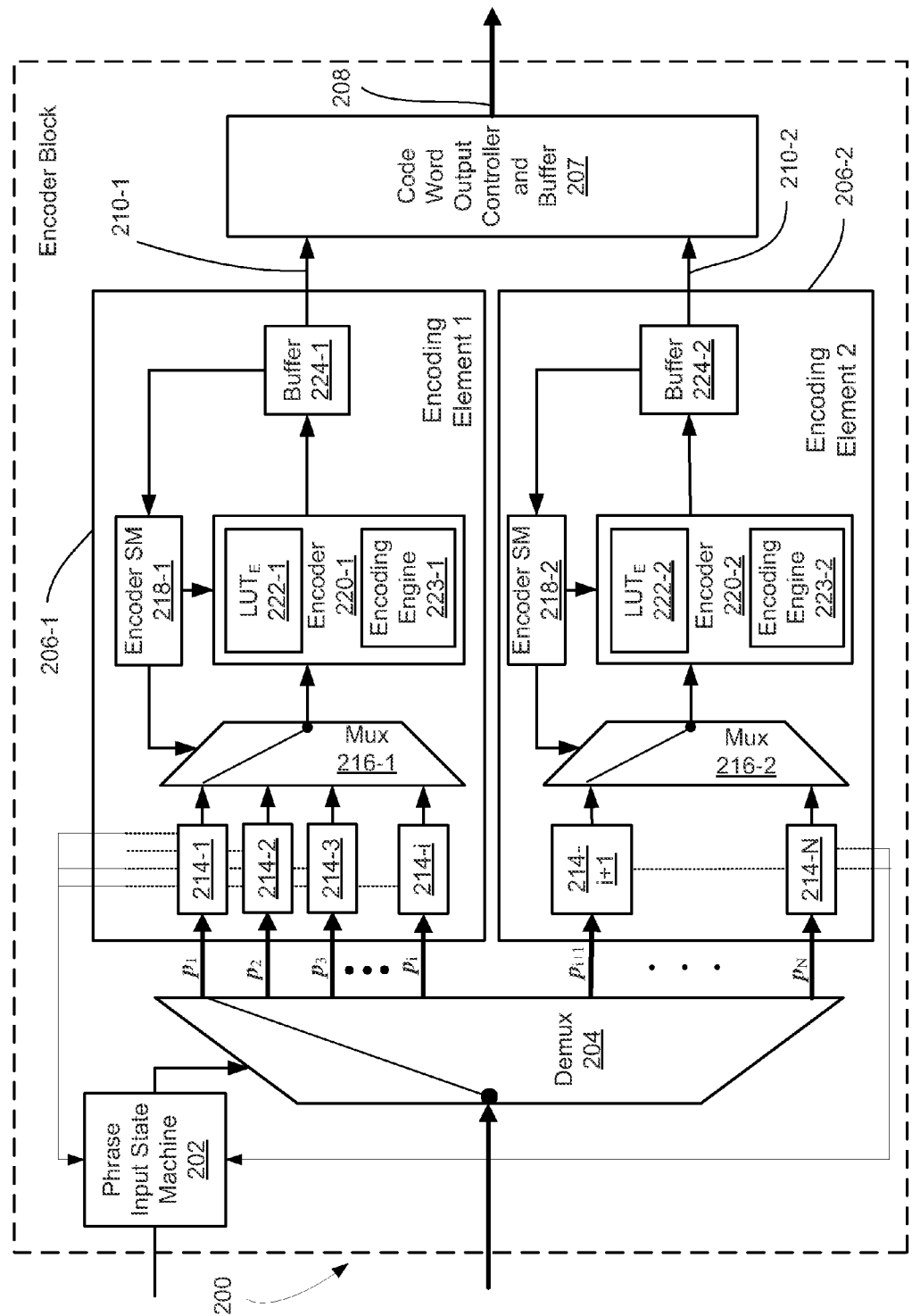
FIG. 5a shows, in block diagram form, an embodiment of an entropy encoder.

FIG. 5a is an expanded view of an embodiment of FIG. 3a showing the encoding elements 206-1 206-2 in simplified expanded form. Reference numerals in the encoding elements 206-1 206-2 include a suffix of −1 or −2 to identify them as separate components. In the embodiment, a code word output controller and buffer 207 receives the outputs 210-1 210-2.

Figure 5B:
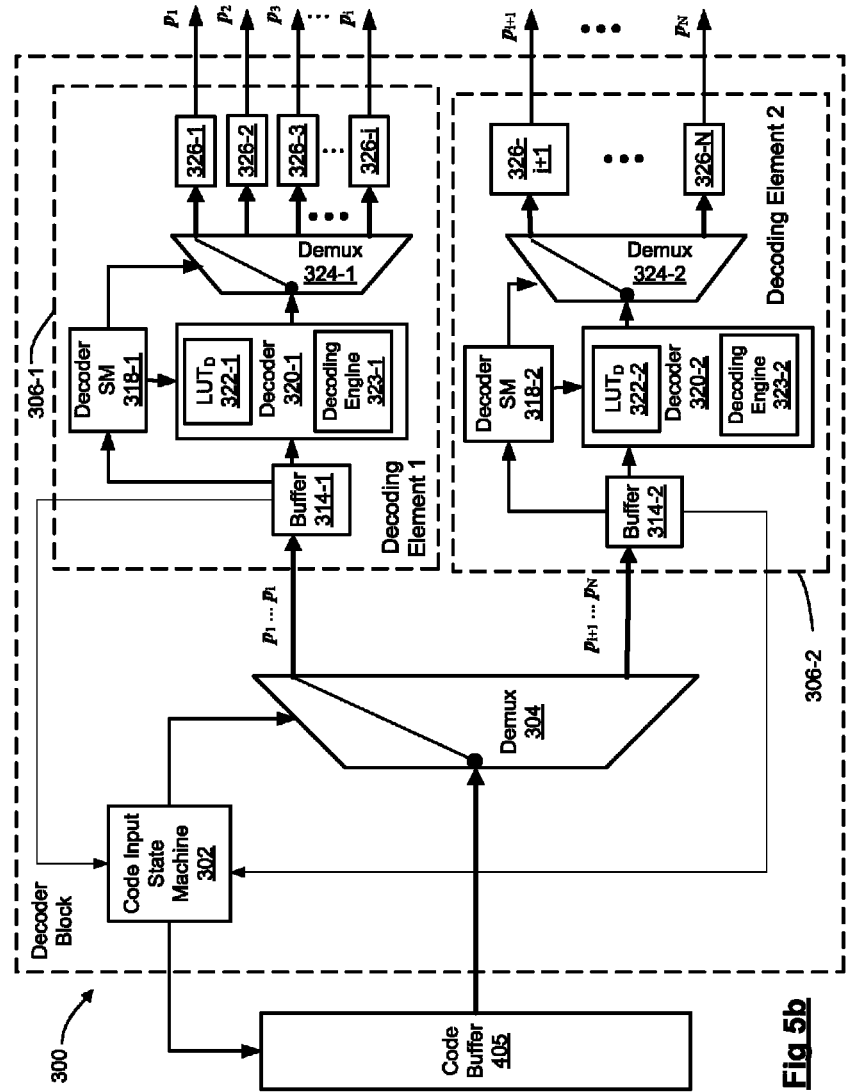
FIG. 5b shows, in block diagram form, an embodiment of an entropy decoder.

FIG. 5b is an expanded view of an embodiment of FIG. 3b showing the decoding elements 306-1 306-2 in simplified expanded form. Reference numerals in the encoding elements 306-1 306-2 include a suffix of −1 or −2 to identify them as separate components. As illustrated, the entropy decoder block 300 outputs leaf node contents.

Figure 6:
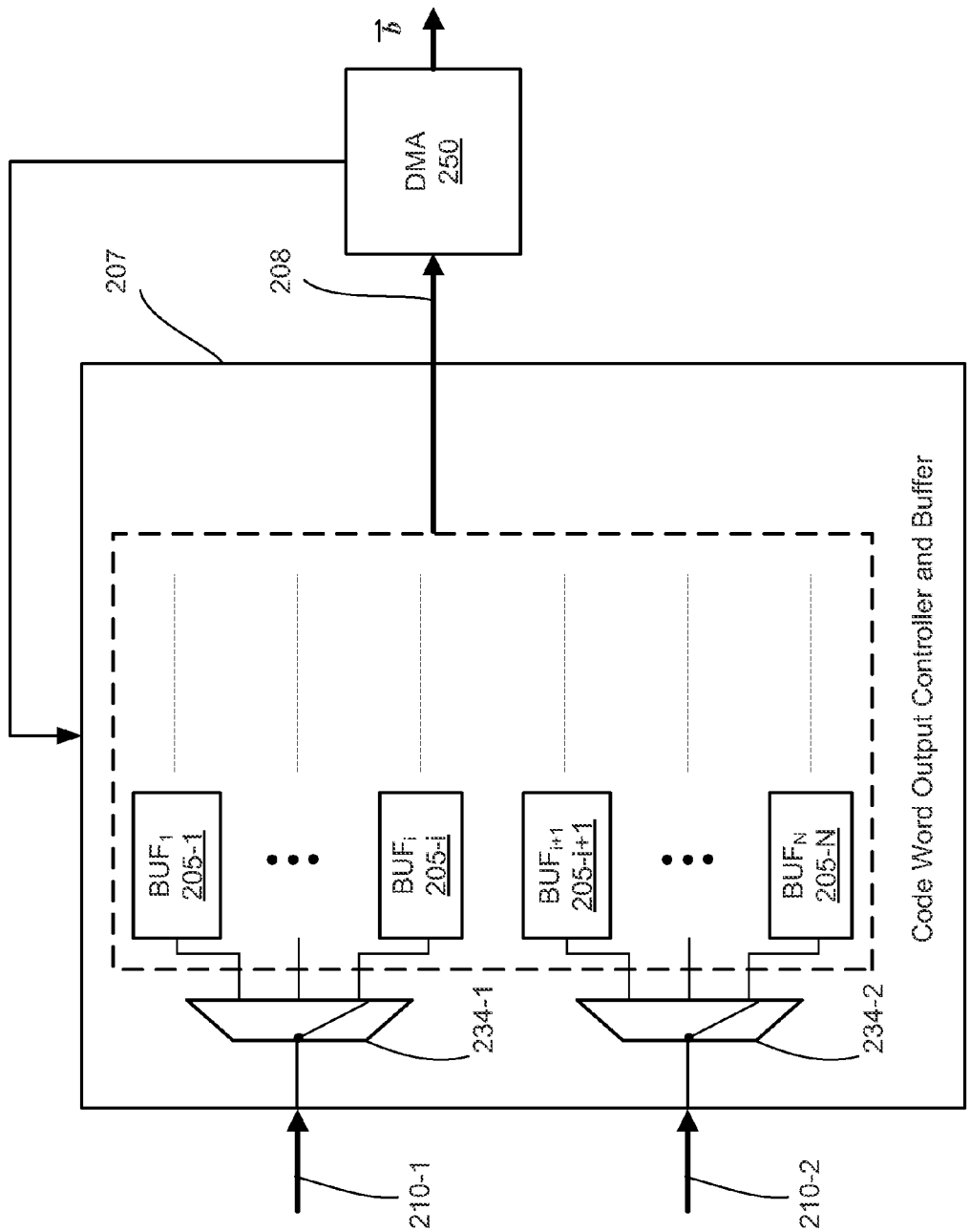
FIG. 6 shows, in block diagram form, an embodiment of a code word output controller and buffer.

FIG. 6 is a simplified block diagram of an embodiment of a code word output controller and buffer 207 for assembling code words from the communication channels 210-1 210-2 of the encoding elements 206-1 206-2. The code word output controller and buffer 207 receives code word bits through the communication channel 210-1 along with an indication of the associated probability for each set of code word bits. Control logic within the code word output controller and buffer 207 directs the code word bits to a corresponding code word output buffer 205-1 . . . 205-N. As phrase words are processed by the encoding elements 206-1 and 206-2, the processed code word bits are collected in the code word output buffers 205-1 . . . 205-N until a code word is completed. A downstream component, such as DMA 250 may be used to generate a bitstream from the collected code words and optionally to include associated probability information in the bitstream.

In embodiments where one or more encoding elements 206-1 . . . 206-d service the same associated probability, the code word output controller and buffer 207 is preferably further operative to distribute the output bits corresponding to the same associated probability from each of the one or more encoding elements 206-1 . . . 206-d to the same code word buffer 205-1 . . . 205-N to collect the bits to assemble the code word. While it is possible to include additional buffers, it is preferable to assemble the code word bits processed by different encoding elements 206-1 . . . 206-d soon after the encoding process to simplify control and management of the data.

Figure 7:
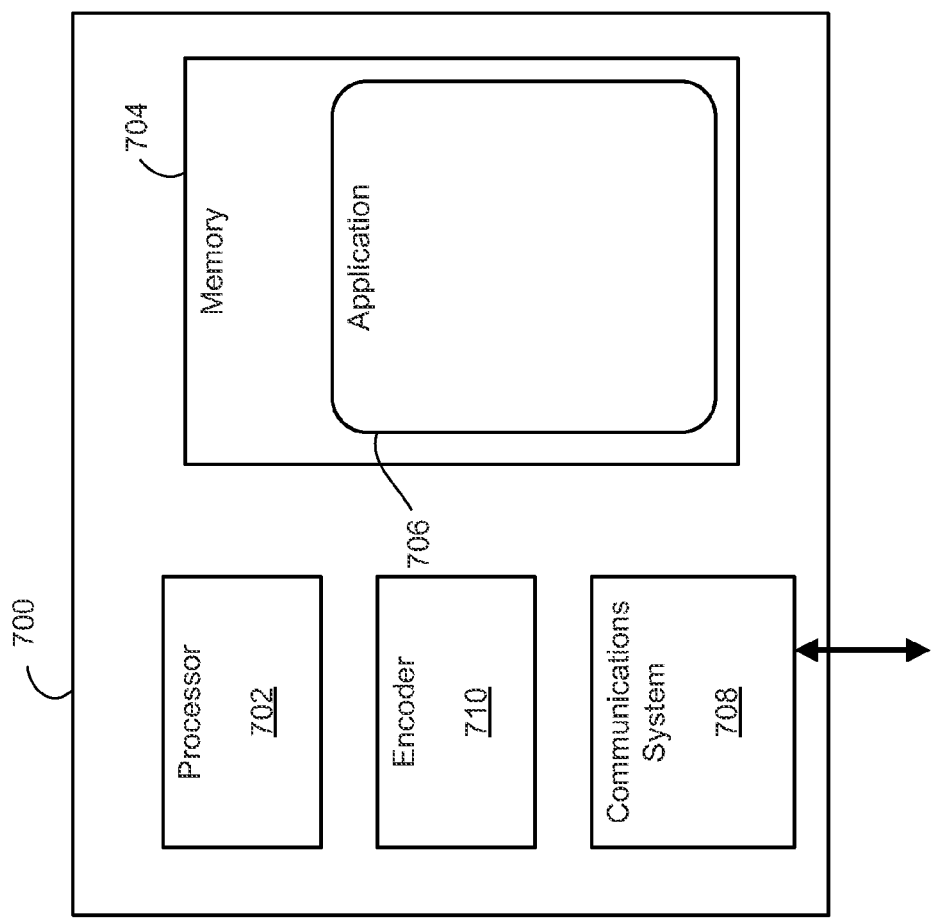
FIG. 7 shows, in block diagram form, a computing device including an encoder.

FIG. 7 is an embodiment of a computing device 700 including an encoder 710 for encoding data as described above. The computing device 700 further includes a processor 702 and memory 704, for execution of program code on the device 700 as well as management of the encoder 710, and preferably a communications system 708. In an embodiment device 700 may further comprise an in input interface such as an RCA jack, microphone or digital input, such as a digital camera, for inputting data content to be encoded and an output interface such as a screen, speaker or headphone jack for outputting content to a user of the device 700. In the embodiment illustrated an application 706 is resident in the memory 704, for instance for controlling the encoder 710.

Figure 8:
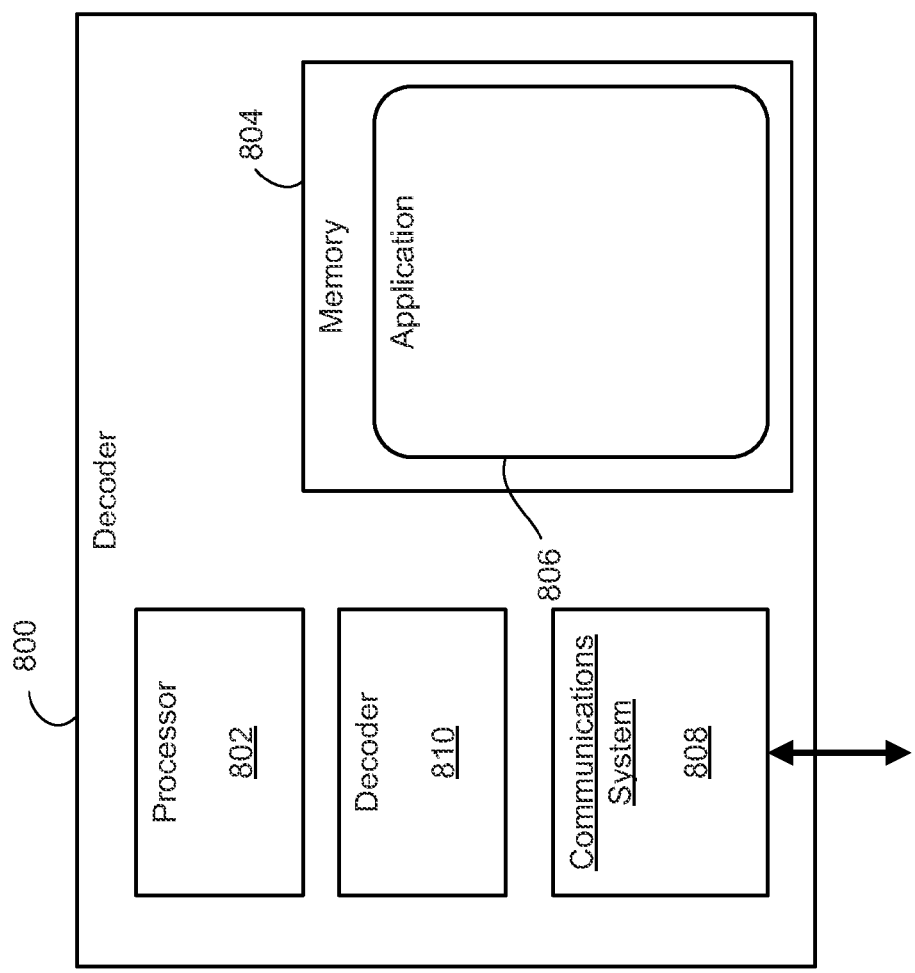
FIG. 8 shows, in bloc diagram form, a computing device including a decoder; and, FIG. 9 shows, in block diagram form, a computing device including an encoder and a decoder.

FIG. 8 is an embodiment of a computing device 800 including a decoder 810 for decoding data as described above. The computing device 800 further includes a processor 802 and memory 804, for execution of program code on the device 800 as well as management of the encoder 810, and preferably a communications system 808. In an embodiment device 800 may further comprise an in input interface such as an RCA jack, microphone or digital input, such as a digital camera, for inputting data content and an output interface such as a screen, speaker or headphone jack for outputting decoded content to a user of the device 800. In the embodiment illustrated an application 806 is resident in the memory 804, for instance for controlling the encoder 810.

Figure 9:
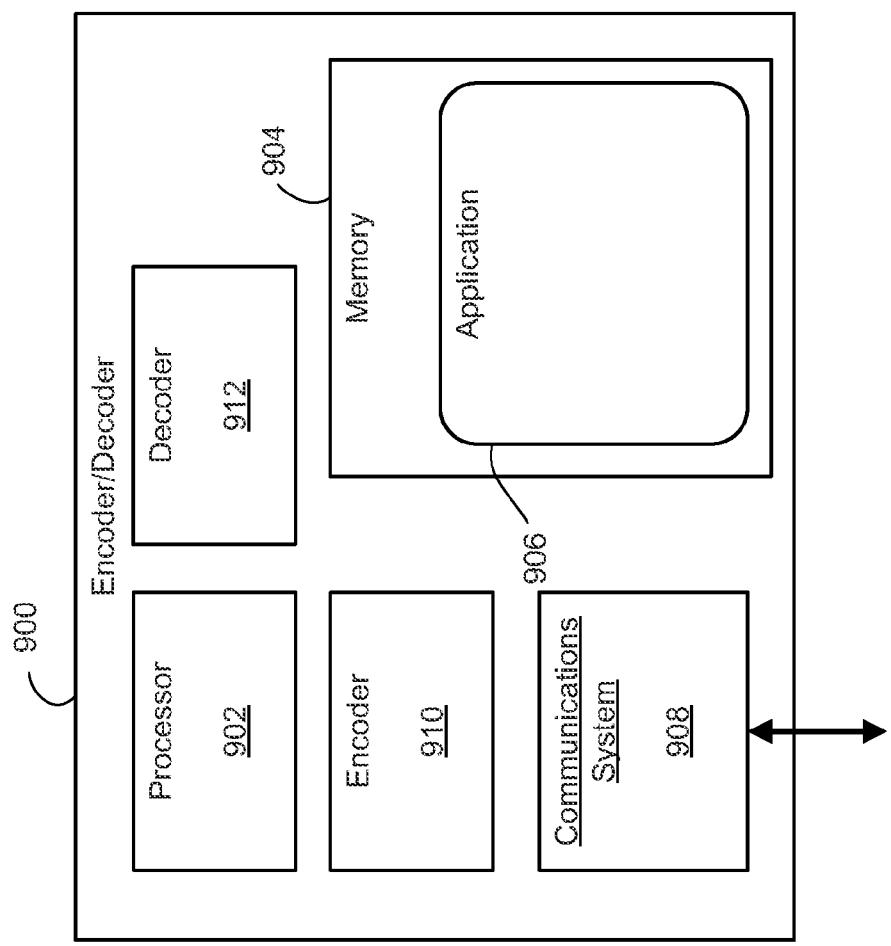

FIG. 9 is an embodiment of a computing device 900 including both an encoder 910 and a decoder 912. The computing device 900 further includes a processor 902 and memory 904, for execution of program code on the device 900 as well as management of the encoder 910, and preferably a communications system 908. In an embodiment device 900 may further comprise an in input interface such as an RCA jack, microphone or digital input, such as a digital camera, for inputting data content to be encoded and an output interface such as a screen, speaker or headphone jack for outputting decoded content to a user of the device 900. In the embodiment illustrated an application 906 is resident in the memory 904, for instance for controlling the encoder 910.

Accordingly in an embodiment such as FIG. 9, a computing device may be provided for video conferencing including an entropy encoder and an entropy decoder as described above. The entropy encoder and entropy decoder allowing for efficient real time compression and decompression of live audio and video.

FIG. 10a is an expanded view of an alternate embodiment of encoder block 200 from FIG. 5a. In the embodiment of FIG. 10a, encoder block 200 includes encoding elements 206-1 206-2 that each comprise an encoder input buffer 214-1 214-2, entropy encoder 220-1 220-2, encoder state machine 218-1 218-2 and output buffer 224-1 224-2. Encoders 220-1 220-2 each comprise an encoding engine 223-1 223-2 and may each comprise a subset of the encoding lookup tables $LUT_E$ 222-1 222-2. The encoding lookup tables $LUT_E$ 222-1 222-2 each comprising at least one encoding search tree associated with one of the N associated probabilities.

The encoder state machine 218-1 218-2 is operative to direct the input buffer 214-1 214-2 to transfer phrase bits to the encoder 220-1 220-2 for encoding when the output buffer 224-1 224-2 is available. The encoder state machine 218-1 218-2 is further operative to direct the encoder 220-1 220-2 to select a table from the encoding lookup tables available to the encoder 220-1 220-2, the table corresponding to the probability associated with the phrase word to be encoded. In an embodiment the indication of the probability may be communicated to the encoding element 206-1 206-2 and stored in the input buffer 214-1 214-2 along with the phrase word.

Encoding engine 223-1 223-2 operates on the phrase bits by traversing the selected table to generate an output code word. Upon generating the output code word, the encoder 220-1 220-2 transfers the code word to a code word output buffer 224-1 224-2. When a downstream processing block transfers the code word from the code word output buffer 224-1 224-2, the encoder state machine 218-1 218-2 selects the next phrase stored in encoder input buffer 214-1 214-2 for encoding.

Figure 10B:
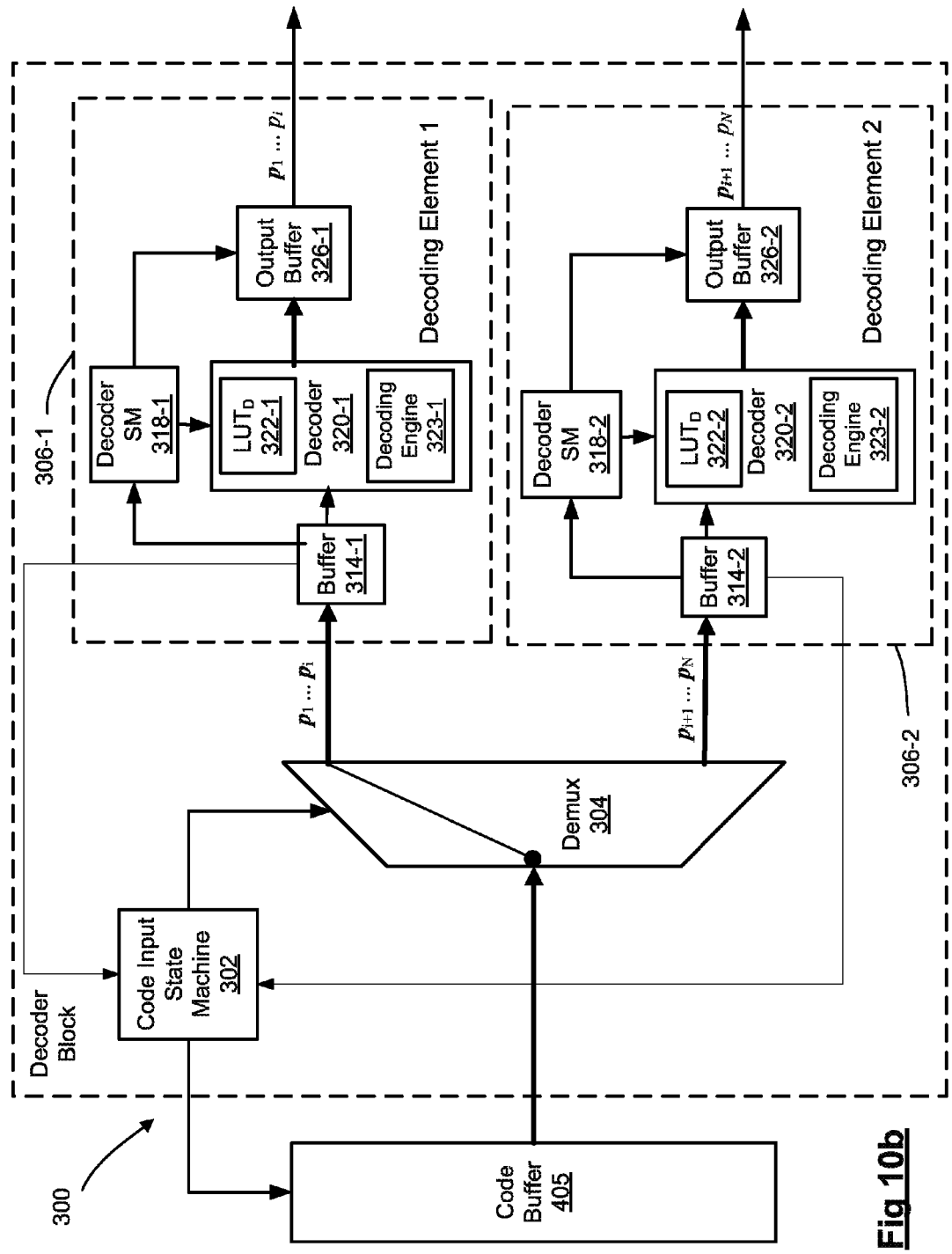
FIG. 10b shows, in block diagram form, an embodiment of an entropy decoder.

FIG. 10b is an expanded view of an alternate embodiment of decoder block 300 from FIG. 5b. In the embodiment of FIG. 10b, the decoder block 300 comprises a code input state machine 302, a demultiplexer 304 and decoding elements 306-1 306-2. The decoding elements 306-1 306-2 each comprise a decoder input buffer 314-1 314-2, decoder 320-1 320-2 and an output buffer 326-1 326-2. The decoder state machine 318-1 318-2 operative to read from the decoder input buffer 314-1 314-2 an indication of the probability associated with the code word in the decoder input buffer 314-1 314-2, and operative to direct the decoder 320-1 320-2 to select a decoding lookup table 322-1 . . . 322-i corresponding to the probability associated with the code word.

The decoders 320-1 320-2 each comprising an entropy decoding engine 323-1 323-2 and i decoding lookup tables $LUT_D$ 322-1 . . . 322-i each corresponding to one of the associated probabilities serviced by the decoding element 306-1 306-2. The decoding lookup tables $LUT_D$ 322-1 . . . 322-i each comprising a decoding search tree associated with an associated probability.

The decoder state machine 318-1 318-2 is operative to direct the input buffer 314-1 314-2 to transfer code bits to the decoder 320-1 320-2 for decoding when the output buffer 324-1 324-2 is available. The decoder state machine 318-1 318-2 is further operative to direct the decoder 320-1 320-2 to select a table from the decoding lookup tables available to that entropy decoder 320-1 320-2, the table corresponding to the probability associated with the code word to be decoded. In an embodiment the indication of the probability may be communicated to the decoding element 306-1 306-2 and stored in the input buffer 314-1 314-2 along with the code word. The decoder state machine 318-1 318-2 may further distribute output bits from the decoder 320-1 320-2 to decoder output buffer 326-1 326-2.

Decoding engine 323-1 323-2 operates on the code bits by traversing the selected decoding lookup table to locate the leaf node contents. The leaf node contents comprising a portion, or a compressed portion, of the phrase being decoded from the input code word. Upon generating the leaf node contents, the decoder 320-1 320-2 transfers the leaf node contents to the decoder output buffer 326-1 326-2.

The leaf node contents may be collected, assembled and decompressed in a downstream processing component to re-create the phrase word. An embodiment of such a component is shown in FIG. 6.

Selection of probability trees and distribution of the probability trees across the encoding elements 206-1 . . . 206-d or the decoding elements 306-1 . . . 306-d may be optimized for a particular implementation.

In general, the smaller the physical footprint of the components and the smaller the gate count, the faster the component. In an ideal parallel design each processing element will receive the same amount of data that takes the same amount of processing time to ensure that all processing elements are operating. In selecting the search trees, it is simplest to optimize the process if all trees are roughly equally probable and all trees are roughly the same size. This allows for a simple equal distribution of lookup tables among the encoding elements 206-1 . . . 206-d or the decoding elements 306-1 . . . 306-d and allows each element to operate on its own subset of locally stored lookup tables.

In the case where some probabilities are much more likely than others, one processing element could end up doing most of the calculations, leaving the other processing units idle waiting for a low probability code word/phrase word. To improve the performance of the system, if it is not possible to 'tune' the trees to roughly match their probabilities and size, it is possible to distribute the trees across the encoding elements 206-1 . . . 206-d or decoding elements 306-1 . . . 306-d such that the sum of the probabilities serviced by each encoding element 206-1 . . . 206-d or decoding element 306-1 . . . 306-d is approximately equal. An additional factor is the size of the trees (lookup tables) which could have an effect on the speed if, for instance, one encoding element 206-1 . . . 206-d or decoding element 306-1 . . . 306-d contained all of the large trees such that it ran slower than the other elements.

In an embodiment, one could assign all trees to all encoding elements 206-1 . . . 206-d or decoding elements 306-1 . . . 306-d and include control logic to distribute data to avoid any elements going idle. This allows for all elements to operate on any phrase word or code word.

Assigning all trees to all encoding elements 206-1 . . . 206-d is not the optimal choice, as it is preferred to minimize the number of lookup tables 222 322 located within each encoder 220 or decoder 320 respectively. Minimizing the number of lookup tables 222-322 reduces the physical size of each encoder 220 or decoder 320, which reduces the latency time of the hardware.

Similar criteria may be used to determine the optimum number of encoding elements 206-1 . . . 206-d or decoding elements 306-1 . . . 306-d, including the clock speed of the silicon in order to meet the timing requirements of the encoder block 200 or decoder block 300. Generally, the optimal design uses the least encoding elements 206-1 . . . 206-d or decoding elements 306-1 . . . 306-d with the least repetition of lookup tables 222 322 such that the sum of the probabilities serviced by each encoding element 206-1 . . . 206-d or decoding element 306-1 . . . 306-d is approximately equal.

Certain adaptations and modifications of the described embodiments can be made. Therefore, the above discussed embodiments are considered to be illustrative and not restrictive.

What is claimed is:

1. An entropy encoder block for use in a context adaptive encoder, the entropy encoder block for encoding phrase words into code words using N search trees, the N search trees each corresponding to a probability from a set of N probabilities used by a context modeling component of the context adaptive encoder, the context modeling component processing each phrase word to determine an associated probability corresponding to one of the N probabilities for each phrase word, the entropy encoder block comprising:

a plurality of encoding elements for receiving, from the context modeling component, phrase words and an indication of the associated probability for each phrase word, each encoding element of the plurality of encoding elements including an encoder having:
an encoding engine; and
one or more lookup tables each containing search tree data representative of one of the N search trees such that all N search trees are represented by at least one encoding element, but not all N search trees are represented in every encoding element, the encoding engine operative to receive input phrase words and encode each input phrase word using a lookup table corresponding to the indication of the associated probability of the input phrase word.

2. The entropy encoder block of claim 1 wherein each encoding element of the plurality of encoding elements further has a state machine in communication with the encoder of that encoding element, the state machine operative to direct the encoder to select a corresponding lookup table to the indication of the associated probability of the input phrase word for use by the encoding engine when processing the input phrase word.

3. The entropy encoder block of claim 2 wherein each encoding element of the plurality of encoding elements further includes:

one or more input buffers, each input buffer assigned to one of the one or more lookup tables; and a multiplexing element in communication with the one or more input buffers and the encoder, the multiplexing element driven by the state machine, the state machine operative to direct the encoder to select the corresponding lookup table by directing the multiplexing element to select a one of the one or more input buffers to transfer the phrase word to the encoder, the one of the one or more input buffers indicating to the encoder to select the corresponding lookup table.

4. The entropy encoder block of claim 3 further comprising:

a de-multiplexing element in communication with a phrase buffer serviced by the context modeling component and in communication with the one or more input buffers of all of the plurality of encoding elements, the de-multiplexing element driven by a phrase input state machine;

the phrase input state machine in communication with the phrase buffer and in communication with the one or more input buffers of all of the plurality of encoding elements, such that the phrase input state machine directs the phrase buffer to transfer a phrase word to the de-multiplexing element and directs the de-multiplexing element to transfer the phrase word to a one of the one or more input buffers of all of the plurality of encoding elements that corresponds to the indication of the associated probability for that phrase word when the one of the one or more input buffers of all of the plurality of encoding elements is available.

5. The entropy encoder block of claim 2 wherein each encoding element of the plurality of encoding elements further has an output buffer in communication with the state machine of that encoding element, and the state machine is operative to direct the encoder for that encoding element to operate when the output buffer is available.

6. The entropy encoder block of claim 1 further comprising:

a code word output controller and buffer in communication with the output buffers from each of the encoding elements, and in communication with a downstream component for receiving completed code words;

the code word output controller and buffer operative to receive the code word and the associated probability from the encoding elements and direct each code word to a corresponding one of N code word buffers based on the associated probability;

wherein the code words are collected in the N code word buffers to complete the code words for each associated probability.

7. The entropy encoder block of claim 1 wherein each encoding element includes an equal number of lookup tables from the N search tables.

8. The entropy encoder block of claim 1 wherein the N search trees are distributed across the encoding elements based on an estimated frequency of occurrence of each associated probability, such that encoding elements with comparatively fewer input buffers are servicing phrase words with the associated probability having a higher estimated frequency of occurrence and encoding elements with comparatively more input buffers are servicing phrase words with the associated probability having a lower estimated frequency of occurrence, whereby estimated workloads of encoding elements are substantially balanced.

9. The entropy encoder block of claim 1 wherein each encoding element further comprises an input buffer for each of the one or more lookup tables, and wherein the indication of the associated probability comprises a selection of the input buffer.

10. The entropy encoder block of claim 1 wherein at least two of the encoding elements each include a copy of a same encoding lookup table.

11. A computing device comprising a processor, memory and an entropy encoder including the entropy encoder block of claim 1.

12. An entropy decoder block for use in a context adaptive encoder, the entropy decoder block for decoding code words into phrase words using N search trees, each search trees each corresponding to a probability from a set of N probabilities used by a context modeling component, the context modeling component processing each code word to determine an associated probability corresponding to one of the N probabilities for each code word, the entropy decoder block comprising:
a plurality of decoding elements for receiving, from the context modeling component, code words and an indication of the associated probability for each code word, each decoding element comprising:
a decoding engine; and
one or more lookup tables each containing search tree data representative of one of the N search trees such that all N search trees are represented by at least one decoding element, but not all N search trees are represented in every decoding element, the decoding engine operative to receive input code words and decode each input code word using a lookup table corresponding to the indication of the associated probability of the input code word.

13. The entropy decoder block of claim 12 wherein each decoding element of the plurality of encoding elements further has a state machine in communication with the decoder of that decoding element, the state machine operative to direct the decoder to select a corresponding lookup table to the indication of the associated probability of the input code word for use by the decoding engine when processing the input code word.

14. The entropy decoder block of claim 12 wherein each decoding element of the plurality of decoding elements further includes:
one or more output buffers, each output buffer assigned to one of the one or more lookup tables; and
a de-multiplexing element in communication with the one or more output buffers and the decoder, the de-multiplexing element driven by the state machine, the state machine operative to direct the decoder to select the corresponding lookup table based upon the indication of the associated probability and to direct the de-multiplexing element to select a one of the one or more output buffers assigned to the associated probability and to transfer the leaf node content to the selected one of the one or more output buffers.

15. The entropy decoder block of claim 14 further comprising:
a de-multiplexing element in communication with a code buffer serviced by the context modeling component and in communication with the decoding elements, the de-multiplexing element driven by a code input state machine;
the code input state machine, in communication with the code buffer and the decoding elements, operative to direct the code buffer to transfer a code word to the de-multiplexing element and direct the de-multiplexing element to transfer the code word to a one of the decoding elements available to process the code word with the indication of the associated probability for that code word.

16. The entropy decoder block of claim 14 wherein each state machine of the decoding elements is operative to direct the decoder for that decoding element to operate when all of the one or more output buffers are available.

17. The entropy decoder block of claim 12 wherein each decoding element includes an equal number of lookup tables from the N search trees.

18. The entropy decoder block of claim 12 wherein the lookup tables are distributed across the decoding elements based on an estimated frequency of occurrence of each associated probability, such that decoding elements with comparatively fewer lookup tables are servicing code words with the associated probability having a higher estimated frequency of occurrence and decoding elements with comparatively more lookup tables are servicing code words with the associated probability having a lower estimated frequency of occurrence, whereby estimated workloads of decoding elements are substantially balanced.

19. The entropy decoder block of claim 12 wherein each decoding element further comprises an input buffer for each of the one or more lookup tables, the indication of the associated probability comprises a selection of the input buffer.

20. The entropy decoder block of claim 12 wherein at least two of the decoding elements each include a copy of a same lookup table.

21. A computing device comprising a processor, memory and an entropy decoder including the entropy decoder block of claim 12.

* * * * *